Jan. 11, 1949.     F. LUZZATTO ET AL     2,458,612
AUTOMATIC SHEARING APPARATUS
Filed Sept. 20, 1945     2 Sheets-Sheet 1
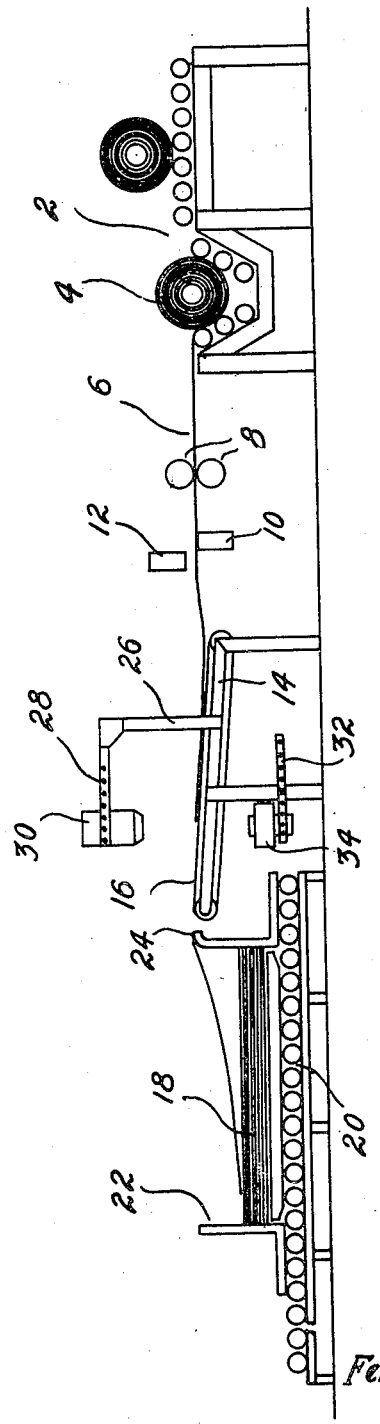
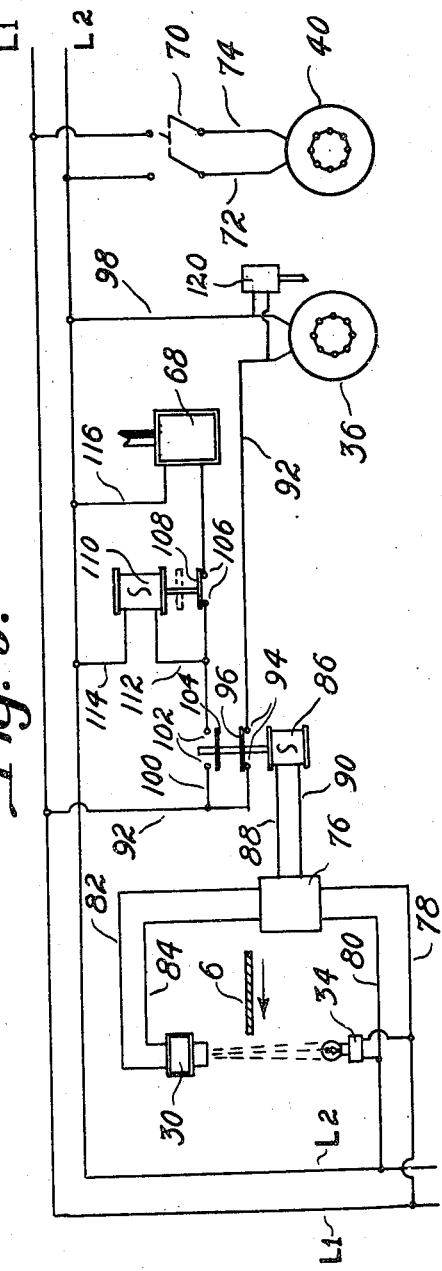
INVENTOR
Ferdinand Luzzatto & James C. Palmer
BY Donald S. Dalton
ATTORNEY

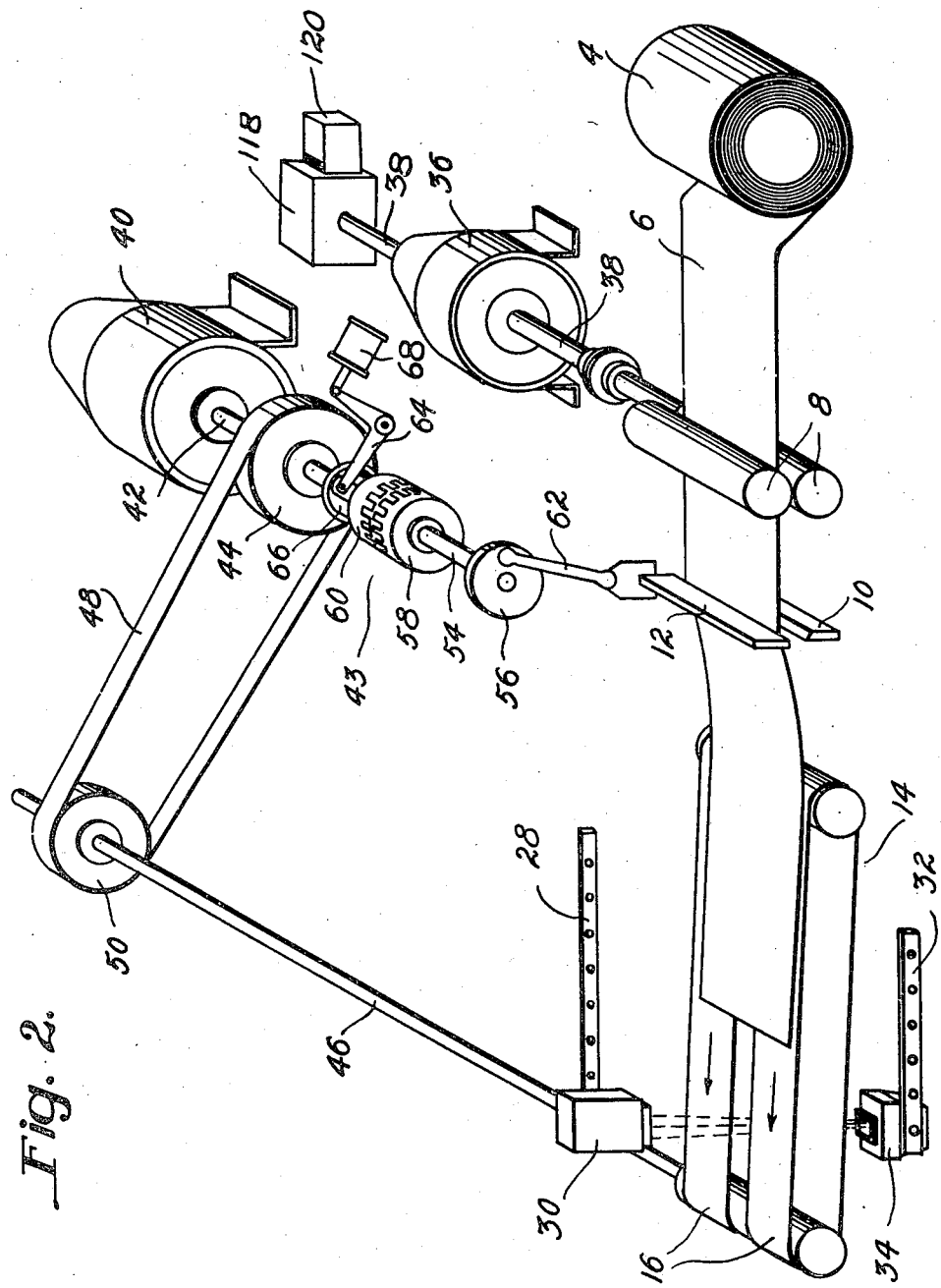

Patented Jan. 11, 1949

2,458,612

UNITED STATES PATENT OFFICE 2,458,612

AUTOMATIC SHEARING APPARATUS

Ferdinand Luzzatto and James C. Palmer, Gary, Ind.

Application September 20, 1945, Serial No. 617,536

8 Claims. (Cl. 164—49)

1

This invention relates to apparatus for automatically shearing elongated material to predetermined lengths.

The invention has among its objects the provision of a simple apparatus for shearing elongated material, as for example, strip metal, to adjustable predetermined lengths in a continuous operation.

This and other objects of the invention will be more apparent in the following description.

In the drawings:

Figure 1 is a schematic view in side elevation of a shearing apparatus in accordance with the present invention together with an uncoiler feeding the shear and a sheet piler into which the sheared sheets are fed;

Figure 2 is an enlarged diagrammatic view in perspective of the shearing apparatus shown in Figure 1; and Figure 3 is a wiring diagram of the circuit by which the shearing apparatus is controlled.

The shearing apparatus of the invention, shown in connection with the processing of sheet metal strip, is fed with sheet metal strip 6 from a coil 4 positioned in the uncoiler 2, as shown in Figure 1. Strip from the coil is fed by means of pinch rolls 8 between the bottom and top blades 10 and 12, respectively, of a shear and thence to the continuously driven belt conveyor 14. Sheets 18 sheared from the forward end of the strip by actuation of the blade 12 of the shear are fed by conveyor 14 upwardly at a slight angle to a sheet piler positioned on conveyor table 20, said piler including the rear wall forming abutment 22 and front wall forming abutment 24 resting on the conveyor table.

The shear is automatically actuated, as will be more apparent hereinafter, when the forward end of the strip has progressed a predetermined distance past the shear by means of a photoelectric control which is actuated when the strip interrupts a beam of light directed toward the photocell thereof. Such photoelectric control includes a light source 34 directing a beam of light upwardly between the parallel spaced belts 16 of the conveyor 14, such beam normally falling upon the photocell 30, under which condition the shear is inoperative. When the forward end of the strip, however, interrupts such beam, pinch rolls 8 are stopped and shear blade 12 is actuated to cut off the strip. The length of sheets so sheared may be adjusted by means of the adjustable mounting bar 32 for the light source, said mounting bar being slidable on the frame of the conveyor 14 as indicated, there

2 being means such as holes spaced along the bar to enable it to be located in position by means such as a reciprocable locking pin in the frame. The photocell 30 is correspondingly adjusted and mounted by means of the standard 26 attached to the conveyor frame, said standard supporting the horizontal adjustable arm 28 which in turn supports the photocell, arm 28 being adjustable transversely of standard 26 and being locked in adjusted position thereon by a locking pin on the standard cooperating with a selected one of the spaced holes on arm 28.

As shown in Figure 2, pinch rolls 8 supplying strip to the shear are driven by means of motor 36 which drives the lower of said rolls through the medium of motor shaft 38 attached thereto by a flexible coupling. The reciprocable shear blade 12 is driven by motor 40 through the medium of motor shaft 42, selectively operable clutch 43 driving shaft 54, to which the blade is connected by means of crank 56 and pitman 62. Mounted on motor shaft 42 is a pulley 44 which drives conveyor belts 16 of conveyor 14 through the medium of belt 48 which connects the pulley 44 and the pulley 50 on the shaft 46 connected to the conveyor. Motor 40 is constantly driven during operation of the apparatus so that the conveyor belts 16 constantly run in the direction shown by the arrows in Figure 2. The mechanism for driving belts 16 is such that they run at the same surface speed as, or a somewhat higher surface speed than, the surface speed of pinch rolls 8.

Selective operation of the shear is, as indicated, effected by means of the clutch 43 which consists of a toothed portion 58 pinned to the independent shaft 54, and a longitudinally slidable complementary toothed portion 60 keyed against rotation relative thereto upon shaft 42. It is obvious that when clutch portion 60 is advanced toward part 58 so as to engage the teeth on each part, the shear will be actuated, whereas when part 60 is slid away from part 58, the shear will be at rest. Such reciprocation of clutch part 60 is accomplished by means of the bell crank 64, the inner arm of which has a projection engaging within the grooved collar 66 on clutch part 60, the other arm being connected as shown to the operating plunger of the clutch operating solenoid 68. Thus, when the solenoid plunger is projected outwardly the clutch portions are brought into engagement to drive the shear whereas when the solenoid plunger is retracted the clutch parts are disconnected and the shear is rendered inoperative.

The control circuit for the shearing mechanism above described is such that when the forward end of the strip to be sheared interrupts the light beam from source 34, pinch rolls 8 and therefore the strip fed thereby are stopped and shear blade 12 is actuated to cut off a sheet of the desired length from the forward end of the strip. During stoppage of the strip and before completion of the shearing operation the forward end of the strip slips on constantly driven conveyor belts 16, but when the sheet has been sheared the conveyor 14 then impels it into subsequent apparatus, such as the piler shown. It will be apparent that with the belts 16 of the conveyor 14 running at the same surface speed as, or at a somewhat higher surface speed than, the surface speed of pinch rolls 8, as above described, the strip will be subjected to tension in that portion between the pinch rolls 8, when the latter are stopped, and the portion of the strip lying on the conveyor 14. The portion of the strip thus brought under tension includes that part which runs through the shear blades 10 and 12, so that when sheared the strip is under tension.

In the wiring diagram shown in Figure 3, power for motors 36 and 40, for the clutch operating solenoid 68, and for the various relays and photo-troller is supplied through the electric mains $L_1$ and $L_2$. Wires 72 and 74 leading to motor 40 are provided with a manually operable double pole switch 70, so that the motor may be stopped when the shearing apparatus is shut down. The photoelectric cell 30 feeds into the photo-troller 76 through wires 82 and 84, the photo-troller in turn feeding into the operating solenoid of the relay 86 through wires 88 and 90. The photo-troller, which is in the nature of an amplifier unit designed for use with a photocell, may be of various known types of which the Westinghouse Type RX Photo-troller is typical.

Before the forward end of the strip 6 shown in Figure 3 has interrupted the light beam from light source 34 the parts are in the position shown in Figure 3. Under these conditions relay 86 is energized to hold its upwardly spring pressed contactor in the downward position so that motor 36 receives current from line $L_1$ through wire 92, contacts 94, and contactor 96, and from line $L_2$ through wire 98.

When, however, the light beam from source 34 is interrupted by the forward end of the strip, photocell 30 no longer supplies current through wires 82 and 84 and thus the solenoid of relay 86 is deenergized. The spring pressed contactor of the relay then assumes its upper position, in which contactor 104 bridges contacts 102 and in which contactor 96 is lifted from fixed contacts 94 thus breaking the feed to motor 36. With the contactors of relay 86 in their upper position, shear operating solenoid 68 is energized by being connected to line $L_1$ through wires 92 and 100, through contacts 102 and contactor 104, and through contacts 106 normally closed by the contactor 108, and from line $L_2$ through wire 116. Thereupon shear blade 12 is actuated in the manner before described by the closing of clutch 43 so that the forward end of the strip is sheared from the sheet.

In order to operate such shear blade for one shearing operation only and to cause it to come to rest in open position, there is provided a time delay relay 110 which operates contactor 108 so that the contactor is lifted and the feed circuit to the clutch operating solenoid is broken a predetermined time interval after energization of the solenoid of such relay 110. The solenoid for relay 110 is energized from line $L_1$ through wires 92, 100, and 112 upon the closing of contacts 102 by contactor 104, and from line $L_2$ through wire 114. The structure of the relay is such that its contactor is caused to break the circuit in which it is interposed a predetermined interval after energization of the solenoid. Various known relays of this type may be employed in the circuit for such purpose, a typical relay of this type being that made by the General Electric Company designated CR 2820-1088, which employs a solenoid armature carrying the movable contactor, the armature being spring pressed in a direction away from the solenoid. The drop out interval of the movable contactor is changed by adjustment of the spring pressure to which the armature is subjected and by substitution of shims of varying thicknesses of non-magnetic material between the solenoid core and the armature.

After the sheared sheet has passed from the conveyor 14 so that its trailing end uncovers light source 34, the light beam again falls upon the photocell, thereby energizing the solenoid of relay 86 and returning the contactor of relay 86 to the lower position whereby motor 36 is again actuated to cause pinch rolls 8 to feed a further length of the strip through the open shears onto the conveyor 14. Upon exhaustion of one coil of material a further coil is then fed through the apparatus for shearing, pinch rolls 8 and conveyor 14 being constantly driven, shear blade 12 remaining in the raised inoperative position until the forward end of such further coil strip in turn interrupts the light beam.

It is preferred that motor 36 be provided with an automatic brake to stop motor shaft 38 when the motor is deenergized. The provision of such brake, shown diagrammatically in Figure 2 as 118, allows the stopping of pinch rolls 8 almost instantaneously when motor 36 is deenergized by the opening of contacts 94, and thus allows the length of the sheared portion of strip to be controlled accurately. Brake 118, which may be of the standard type having brake bands urged by springs against a drum on the driven shaft, has a solenoid 120 which when energized overcomes the spring to withdraw the brake bands from the drum. Such solenoid is connected to motor leads 92 and 98 as shown in Figure 3. Thus, when current flows to motor 36 the brake 118 is inoperative but the moment the current supply through wires 92 and 98 is shut off the brake is applied to stop pinch rolls 8.

It is evident that the apparatus disclosed is simple, efficient, and easily maintained, yet it is flexible in that it allows the shearing of sheets of various lengths to be accomplished by easily made adjustments of the light source and photocell relative to the shear. Having thus fully described a preferred embodiment of the shearing apparatus of the present invention and its mode of operation, what we desire to claim as new is set out in the following claims.

We claim:

1. Apparatus for shearing strip into lengths comprising an intermittently operable shear to cut off the strip, means in front of the shear for feeding strip to and through the open blades of the shear, means for driving the strip feeding means, selectively operable means for driving the shear, means responsive to movement of the forward end of the strip past a predetermined point beyond the shear to stop the means for driving the strip feeding means and thus the means for feeding strip to the shear and to render operable the means to drive the shear, thereby to actuate the shear to cut a predetermined length of sheet from the strip, and means to subject that portion of the strip between the strip feeding means when the latter is stopped and the forward end of the strip to tension, the tensioned portion of the strip including that part thereof passing through the shear whereby the strip is sheared under tension.

2. Apparatus for shearing strip into lengths comprising an intermittently operable shear to cut off the strip, means in front of the shear for positively feeding strip to the shear, a power driven conveyor at the rear of the shear to receive the forward end of the strip and to carry away the sheet sheared from the end thereof in a path in line with the path of travel of the strip, means for driving the strip feeding means, means for driving the conveyor at at least the same surface speed as the strip feeding means, selectively operable means for driving the shear, and means responsive to movement of the forward end of the strip past a predetermined point on the conveyor to stop the means for driving the strip feeding means and thus the means for feeding strip to the shear and to render operable the means to drive the shear, thereby to actuate the shear to cut a predetermined length of sheet from the strip.

3. Apparatus for shearing strip into lengths comprising an intermittently operable shear having opposite shearing blades to cut off the strip, means in front of the shear for positively feeding strip between the blades of the shear, a power driven conveyor at the rear of the shear having frictional engagement with the strip to receive the forward end of the strip and to carry away the sheet sheared from the end thereof in a path in line with the path of travel of the strip, means for driving the strip feeding means, constantly operating means for driving the conveyor at at least the same surface speed as the strip feeding means, selectively operable means for driving the shear, and means responsive to movement of the forward end of the strip past a predetermined point on the conveyor to stop the means for driving the strip feeding means and thus the means for feeding the strip to the shear and to render operable the means to drive the shear, thereby to actuate the shear to cut a predetermined length of sheet from the strip.

4. Apparatus for shearing strip into lengths comprising an intermittently operable shear having opposite shearing blades to cut off the strip, means in front of the shear for positively feeding strip between the blades of the shear, a power driven conveyor at the rear of the shear having frictional engagement with the strip to receive the forward end of the strip and to carry away the sheet sheared from the end thereof, means for driving the strip feeding means, constantly operating means for driving the conveyor at at least the same surface speed as the strip feeding means, means for driving the shear, said means including a constantly operating power means and a selectively operable clutch interposed between the power means and the shear, means for operating the clutch, and means responsive to movement of the forward end of the strip past a predetermined point on the conveyor to stop the means for feeding the strip to the shear and to operate the clutch operating means to drive the shear, thereby to actuate the shear to cut a predetermined length of sheet from the strip.

5. Apparatus for shearing strip into lengths comprising an intermittently operable shear having opposite shearing blades to cut off the strip, means in front of the shear for positively feeding strip between the blades of the shear, a power driven conveyor at the rear of the shear having frictional engagement with the strip to receive the forward end of the strip and to carry away the sheet sheared from the end thereof, means for driving the strip feeding means, constantly operating means for driving the conveyor at at least the same surface speed as the strip feeding means, means for driving the shear, said means including a constantly operating power means and a selectively operable clutch interposed between the power means and the shear, means including a solenoid for operating the clutch, a control circuit connected to the solenoid, means responsive to movement of the forward end of the strip past a predetermined point on the conveyor to stop the means for feeding the strip to the shear and to energize the control circuit and thus energize the solenoid to engage the clutch, thereby to actuate the shear to cut a predetermined length of sheet from the strip, and a normally closed time delay relay having contacts in the control circuit and energized by said circuit for deenergizing the clutch operating solenoid and disconnecting the clutch after the shear has completed one cutting cycle.

6. Apparatus for shearing strip into lengths comprising an intermittently operable shear having opposite shearing blades to cut off the strip, means in front of the shear for positively feeding strip between the blades of the shear, a power driven conveyor at the rear of the shear having frictional engagement with the strip to receive the forward end of the strip and to carry away the sheet sheared from the end thereof, means for driving the strip feeding means, constantly operating means for driving the conveyor at at least the same surface speed as the strip feeding means, means for driving the shear, said means including a constantly operating power means and a selectively operable clutch interposed between the power means and the shear, means including a solenoid for operating the clutch, a control circuit connected to the solenoid, means including a photoelectric cell and a light source positioned on opposite sides of the conveyor so that the light beam from the source falling on the photocell is interrupted by the strip when the forward end thereof has moved past a predetermined point on the conveyor to stop the means for feeding the strip to the shear and to energize the control circuit, thus to energize the solenoid to engage the clutch, thereby to actuate the shear to cut a predetermined length of sheet from the strip, and a normally closed time delay relay having contacts in the control circuit and energized by said circuit for deenergizing the clutch operating solenoid and disconnecting the clutch after the shear has completed one cutting cycle.

7. Apparatus for shearing strip into lengths comprising an intermittently operable shear to cut off the strip, means in front of the shear for positively feeding strip to the shear, a power driven conveyor at the rear of the shear to receive the forward end of the strip and to carry away the sheet sheared from the end thereof in a path in line with the path of travel of the strip, means for driving the strip feeding means, means for driving the conveyor at a surface speed which is somewhat greater than the surface speed of the strip feeding means, selectively operable means for driving the shear, and means responsive to movement of the forward end of the strip past a predetermined point on the conveyor to stop the means for driving the strip feeding means and thus the means for feeding the strip to the shear and to render operable the means to drive the shear, thereby to actuate the shear to cut a predetermined length from the strip.

8. Apparatus for shearing strip into lengths comprising an intermittently operable shear having opposite shearing blades to cut off the strip, means in front of the shear for positively feeding strip between the blades of the shear, a power driven conveyor at the rear of the shear having frictional engagement with the strip to receive the forward end of the strip and to carry away the sheet sheared from the end thereof in a path in line with the path of travel of the strip, means for driving the strip feeding means, constantly operating means for driving the conveyor at a surface speed which is somewhat greater than the surface speed of the strip feeding means, selectively operable means for driving the shear, and means responsive to movement of the forward end of the strip past a predetermined point on the conveyor to stop the means for driving the strip feeding means and thus the means for feeding the strip to the shear and to render operable the means to drive the shear, thereby to actuate the shear to cut a predetermined length of sheet from the strip.

FERDINAND LUZZATTO.
JAMES C. PALMER.

REFERENCES CITED

The following references are of record in the file of this patent:

UNITED STATES PATENTS

| Number | Name | Date |
|---|---|---|
| 605,928 | Shuster | June 1, 1898 |
| 1,058,799 | Shuster | Apr. 15, 1913 |
| 1,776,256 | Harney | Sept. 23, 1930 |
| 2,247,766 | Boerger | July 1, 1941 |